US008655148B2

(12) United States Patent
Coudurier et al.

(10) Patent No.: US 8,655,148 B2
(45) Date of Patent: Feb. 18, 2014

(54) PICTURE OVERLAY OF CAPTIONS ON VIDEO VIA OUT OF BAND COMMUNICATION

(75) Inventors: Baptiste Coudurier, Los Angeles, CA (US); Robert A. Post, Jr., Marina Del Rey, CA (US)

(73) Assignee: Hulu, LLC, Santa Monica, CA (US)

( * ) Notice: Subject to any disclaimer, the term of this patent is extended or adjusted under 35 U.S.C. 154(b) by 0 days.

(21) Appl. No.: 13/488,860

(22) Filed: Jun. 5, 2012

(65) Prior Publication Data
US 2013/0322854 A1 Dec. 5, 2013

(51) Int. Cl.
*H04N 5/92* (2006.01)
*H04N 9/80* (2006.01)
*H04N 7/16* (2011.01)

(52) U.S. Cl.
USPC ........... 386/244; 386/239; 386/248; 725/143; 725/144; 725/151

(58) Field of Classification Search
USPC ................................. 386/239–248
See application file for complete search history.

(56) References Cited

U.S. PATENT DOCUMENTS

| 5,805,153 | A | * | 9/1998 | Nielsen | 725/37 |
| 2003/0095135 | A1 | * | 5/2003 | Kaasila et al. | 345/613 |
| 2007/0154171 | A1 | * | 7/2007 | Elcock et al. | 386/83 |
| 2007/0180486 | A1 | * | 8/2007 | Yoon | 725/115 |

* cited by examiner

*Primary Examiner* — Hung Dang
(74) *Attorney, Agent, or Firm* — Brian N. Young; Fountainhead Law Group P.C.

(57) ABSTRACT

In one embodiment, a method includes storing a caption file including a set of visual representations of captions for a media program and a video file including video information for the media program. A server receives a request for the media program where the request is associated with a user device. The method determines the caption file and the video file for the media program based on the request. The server then sends visual representations of the captions from the caption file out of band with video information from the video file over a network to the user device. The user device is configured to overlay a visual representation of a caption over a portion of the video information.

21 Claims, 4 Drawing Sheets

PICTURE OVERLAY OF CAPTIONS ON VIDEO VIA OUT OF BAND COMMUNICATION

BACKGROUND

Particular embodiments generally relate to video playback.

A user device may be used to play a video using a media player. For example, a server may stream a video to the user device. The device may render and display captions with corresponding video. For example, the captions may be subtitles for audio (e.g., spoken dialogue) associated with the video. In one example, a software renderer of the user device renders the text for the caption on the video being displayed. In this case, a server that is streaming the video to the user device sends a text file, timecodes, and text formatting metadata to the user device. The text file includes captions that are represented in text or a proprietary binary format. The timecodes indicate when to render the text. The text formatting metadata describes formatting used in rendering the text, such as font, location, and size. The software renderer on the user device then renders the text from the text file at corresponding timecodes using the formatting metadata to display the captions with the video.

Different types of user devices may be used by different users, and the different types of user devices may include different software renderers. The different software renderers may render the captions in different formats or in different locations. This may display the captions differently on different user devices. When trying to address problems with the display of the captions, it may be hard for a company to debug the problems because different types of devices render the captions differently. Thus, reproducing the problem may be difficult. Also, some software renderers may not be able to render some captions, such as a software renderer may not be able to render text vertically.

In another example, digital video disc (DVD) players display captions by displaying pictures of the captions with the video. The pictures of the captions are included in the same file with the video. For example, a DVD file may include video (V), audio (A), and captions (C). In this way, the video, audio, and captions are multiplexed together in the file. The DVD player then processes the file to display the video and the pictures of the captions together. For example, the information may be sent in the multiplex sequence of V, A, C, V, A, C, . . . , V, A, C. This sends the captions in-band with the video because the pictures of the captions are included in the same file with the video. Because the captures are included in the same file, when there are any changes to be made to the captions, then the DVD file needs to be changed. This is because the DVD file includes the captions multiplexed with the video and the audio. One change may be adding different languages for the captions. In this case, the DVD file may include the following information of: V, A, C, C (French), C (Spanish), C (Japanese), . . . . When a new language, such as Chinese, needs to be added for the captions, then the DVD file again needs to be changed to multiplex the Chinese captions into the file.

SUMMARY

In one embodiment, a method includes storing a caption file including a set of visual representations of captions for a media program and a video file including video information for the media program. A server receives a request for the media program where the request is associated with a user device. The method determines the caption file and the video file for the media program based on the request. The server then sends visual representations of the captions from the caption file out of band with video information from the video file over a network to the user device. The user device is configured to overlay a visual representation of a caption over a portion of the video information.

In one embodiment, a non-transitory computer-readable storage medium is provided containing instructions, that when executed, control a computer system to be configured for: storing a caption file including a set of visual representations of captions for a media program and a video file including video information for the media program; receiving a request for the media program, the request associated with a user device; determining the caption file and the video file for the media program based on the request; and sending visual representations of the captions from the caption file out of band with video information from the video file over a network to the user device, wherein the user device is configured to overlay a visual representation of a caption over a portion of the video information.

A method is provided comprising: sending, from a user device, a request for the media program to a server, the media program associated with a caption file including visual representations of captions and a video file; receiving, at the user device, visual representations of the captions from the caption file out of band with video information from the video file over a network from the server; determining a visual representation of a caption to render; and overlaying the visual representation of the caption over at least a portion of the video information, wherein captions in the visual representation that are rendered by different user devices are in a same format.

The following detailed description and accompanying drawings provide a better understanding of the nature and advantages of the present invention.

DETAILED DESCRIPTION

Described herein are techniques for a video system for rendering captions using pictures. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
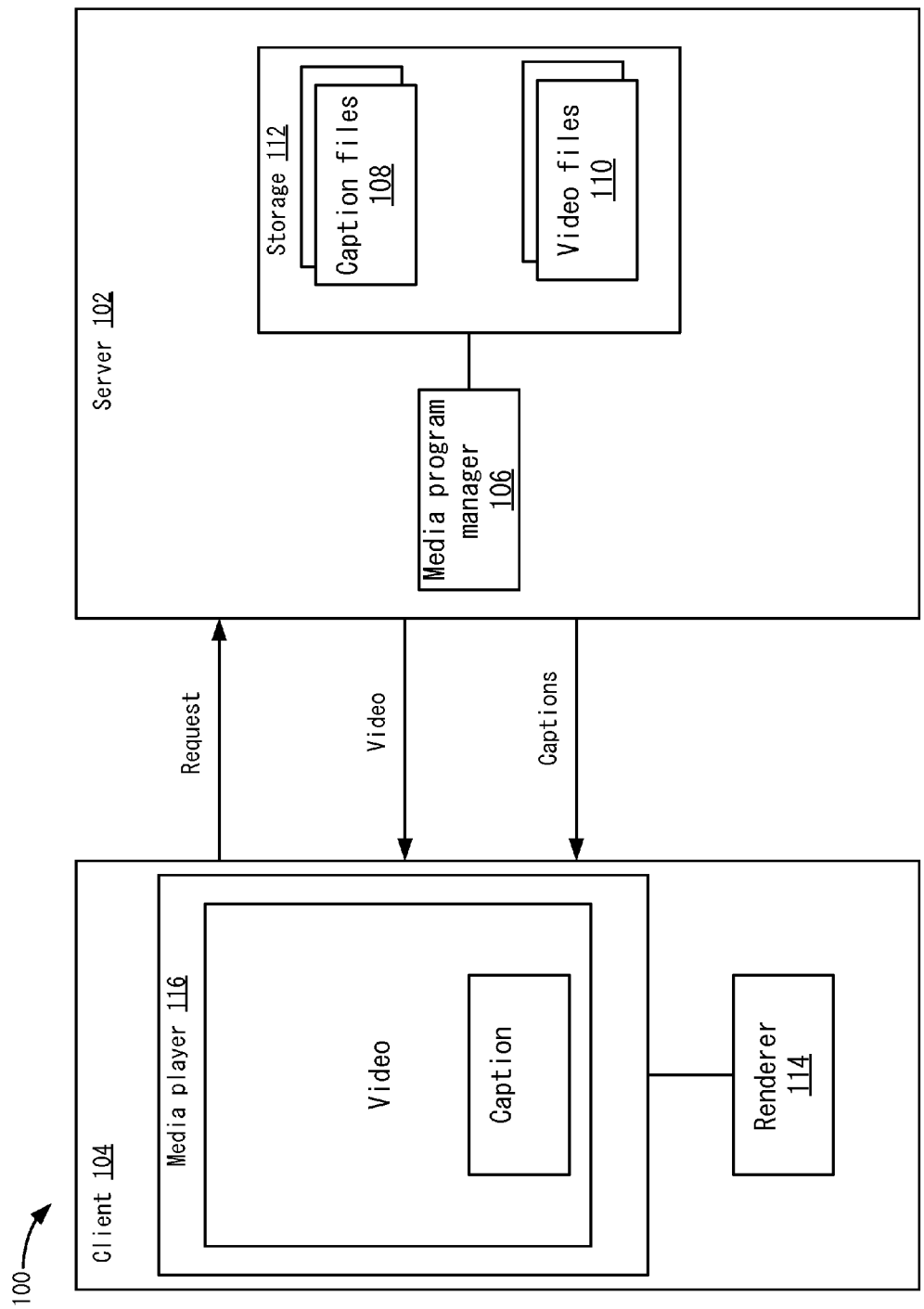
FIG. 1 depicts an example of a system for rendering videos with captions according to one embodiment.

FIG. 1 depicts an example of a system 100 for rendering videos with captions according to one embodiment. System 100 includes a server 102 and a user device 104. Although one server 102 and one user device 104 are shown, it will be understood that multiples instances of server 102 and user device 104 may be appreciated. Server 102 communicates with user device 104 over a network (not shown), such as the Internet or a wide area network (WAN).

User device 104 may be various devices that can play media programs. For example, user device 104 includes cellular phones, smart phones, tablet computers, laptop and desktop computers, televisions, etc. In one example, the media program is for a movie or a television show. The media program may include video, audio, and/or captions.

Server 102 sends media programs to user device 104. For example, user device 104 may request a media program and server 102 streams the media program to user device 104. The media program requested is associated with a specific video. Captions for that video are also provided. The captions may be text information that is associated with the video and/or audio. For example, the captions may be subtitles for the spoken dialogue of an audio track or may describe events occurring in the video.

Particular embodiments provide captions to user device 104 that are visual representations of the caption. For example, the visual representation is a pre-rendered image or picture of the text for the caption. The visual representation may be in different formats, such as portable network graphics (PNG) or joint photographic experts group (JPEG). The term picture will be used for discussion purposes, but other visual representations may be used.

In one embodiment, the pictures are pre-rendered on server 102 before sending to any user devices 104. Although server 102 is discussed as performing the pre-rendering, it will be understood that multiple servers may be used to perform the pre-rendering. Also, different servers 102 may be used to pre-render the pictures and then respond to requests for the media program. In one embodiment, a software renderer on server 102 receives a text file, timecodes, and text formatting metadata. As described above, the text file includes captions that are represented in text or a proprietary binary format. The timecodes indicate when the render the text. The text formatting metadata describes formatting used in rendering the text, such as font, location, and size. Server 102 processes the text file, timecodes, and text formatting metadata, and outputs pictures that include the text and a playlist that describes when to display the pictures. For example, if the caption is "The story begins with . . . ", a picture is rendered with the text "The story begins with . . . ". The text may be rendered in a font specified in the formatting metadata and be rendered horizontally. The playlist would indicate when to display this picture.

Server 102 (or another server) then can provide the pictures to multiple user devices 104. This provides uniformity in the presentation of the captions. For example, different user devices 104 display the same picture that was generated by server 102, and thus the captions appear the same on the different user devices 104. The uniformity is thus preserved even though some user devices 104 have different software renderers and would normally render the text for the captions differently if given the same input. In addition to uniformity, the problems of some software renderers not having the capability to render some captions is avoided because user devices 104 render pictures instead of text. For example, if some user devices 104 cannot render Chinese/Japanese glyphs or render text vertically, these user devices 104 may still display pictures that include the glyphs or vertical text. Additionally, if other problems exist with user devices 104 not being able to render the captions, such as when media players cannot open a second stream to read textual data from text files, these user devices 104 may typically be able to receive and display pictures.

Particular embodiments provide captions out-of-band with corresponding video. For example, caption files and video files are sent through separate channels. The term out-of-band may mean that the captions are sent in a separate stream of information from the video and not multiplexed with the video. The caption file may include a series of pictures that display the text information for the captions. For example, a series of pictures with different subtitles may be included in a caption file 108. The pictures are pre-rendered in that the text information may be rendered into pictures that are stored in caption file 108 before user device 104 receives the pictures. In this case, user device 104 does not need to use a renderer to render text on video. Rather, user device 104 renders the pictures instead.

As described above, server 102 may stream video to user device 104. A media file manager 106 of server 102 receives a request from user device 104 for a media program. The media program may be associated with a video file 110 and a caption file 108 in storage 112. Although storage 112 is shown as being part of server 102, storage 112 may be remotely located in a database and accessed via a network. Audio may also be included in video file 110 or may be included in a separate file. Video file 110 includes a set of video frames. Caption files 108 and video files 110 may be stored separately in storage 112. That is, captions are not multiplexed with video.

Also, caption file 108 includes the pre-rendered pictures displaying corresponding captions for the video frames and is associated with a playlist that describes when to display the pictures with the video. Other metadata may also be included. For example, metadata is included that describes a location to render the picture, such as at certain coordinates. For example, the picture may be smaller than a size of a video frame. The picture is then overlaid on the video frame at a position. For example, the picture is rendered at the bottom of the video frame. In other examples, the picture may be a "full screen" picture and is overlaid over the entire video frame. In this case, the picture may be mostly transparent except for the text of the caption.

Media file manager 106 may retrieve a video file 110 and a corresponding caption file 108 based on the request. Media file manager 106 then streams caption file 108 and video file 110 to user device 104. As described above, pictures from caption file 108 are streamed out-of-band with video from the video file 110.

User device 104 includes a renderer 114 that receives the caption file 108 and video file 110, and renders the video and the pictures of captions on a media player 116. For example, renderer 114 may overlay a picture including a caption from caption file 108 over one or more frames of video from video file 110 based on a time in the playlist that indicates when to display the picture. This process may continue as pictures from caption file 108 are overlaid on corresponding video frames at applicable times. For example, a caption is displayed for a certain duration while video is being played in a media player 116. Because pictures of captions are sent, user device 104 does not need to render text on the video. Rather, pictures are overlaid on video. Also, because pictures are used, the formatting for the captions may be the same across different user devices 104. For example, the font, capitalization, location, or other formatting characteristics are the same when the pictures of captions are displayed on different user devices 104 because different user devices 104 overlay the same picture.

Figure 2:
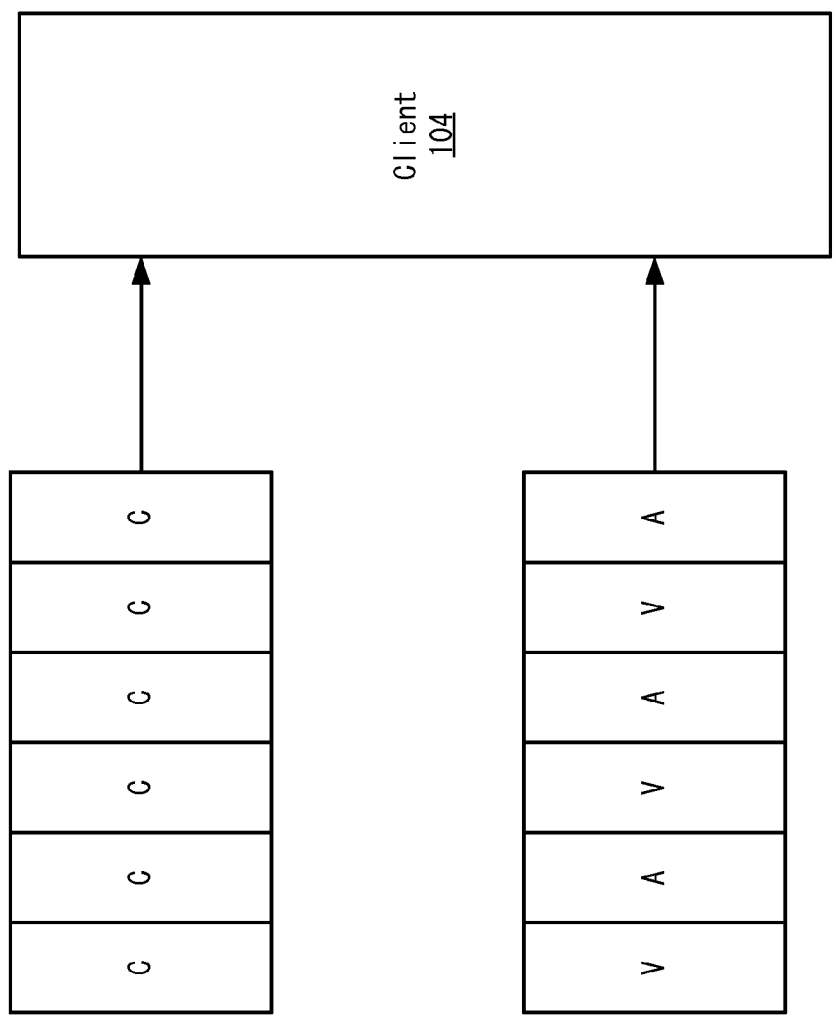
FIG. 2 depicts an example of a video file and a caption file according to one embodiment.

FIG. 2 depicts an example of a video file 110 and a caption file 108 according to one embodiment. As shown, video file 110 includes video (V) and audio (A) multiplexed together. In this case, renderer 114 would receive video file 110 and render video along with corresponding audio that is received in-band with each other.

Caption file 108 includes a series of pictures that include different captions (C). The pictures are sent out-of-band with respect to the video and audio of video file 110. When renderer 114 receives the pictures in caption file 108, renderer 114 renders the pictures with corresponding video and audio. For example, renderer 114 may render a first picture of a caption at a time 0:14 of the video and display the picture for 2 seconds. The location of where to render the picture may also be specified.

Because captions are delivered out-of-band with respect to video, changes to captions may be made without changing video file 110. For example, if the format of captions needs to be edited, the captions can be edited in caption file 108 without affecting video file 110. Further, if additional caption files 108 need to be added, such as for a different language, for the media program, a separate caption file 108 may be generated for a new language without affecting video file 110. However, if the captions were delivered in-band with the video, then captions for the new language would have to be multiplexed with the video and audio, and video file 110 would have to be edited. When video files 110 are encoded in multiple bit rates, then this multiplies the number of video files 110 that need to be edited as each video file 110 for each bit rate needs to be edited when captions are multiplexed in video file 110.

Figure 3:
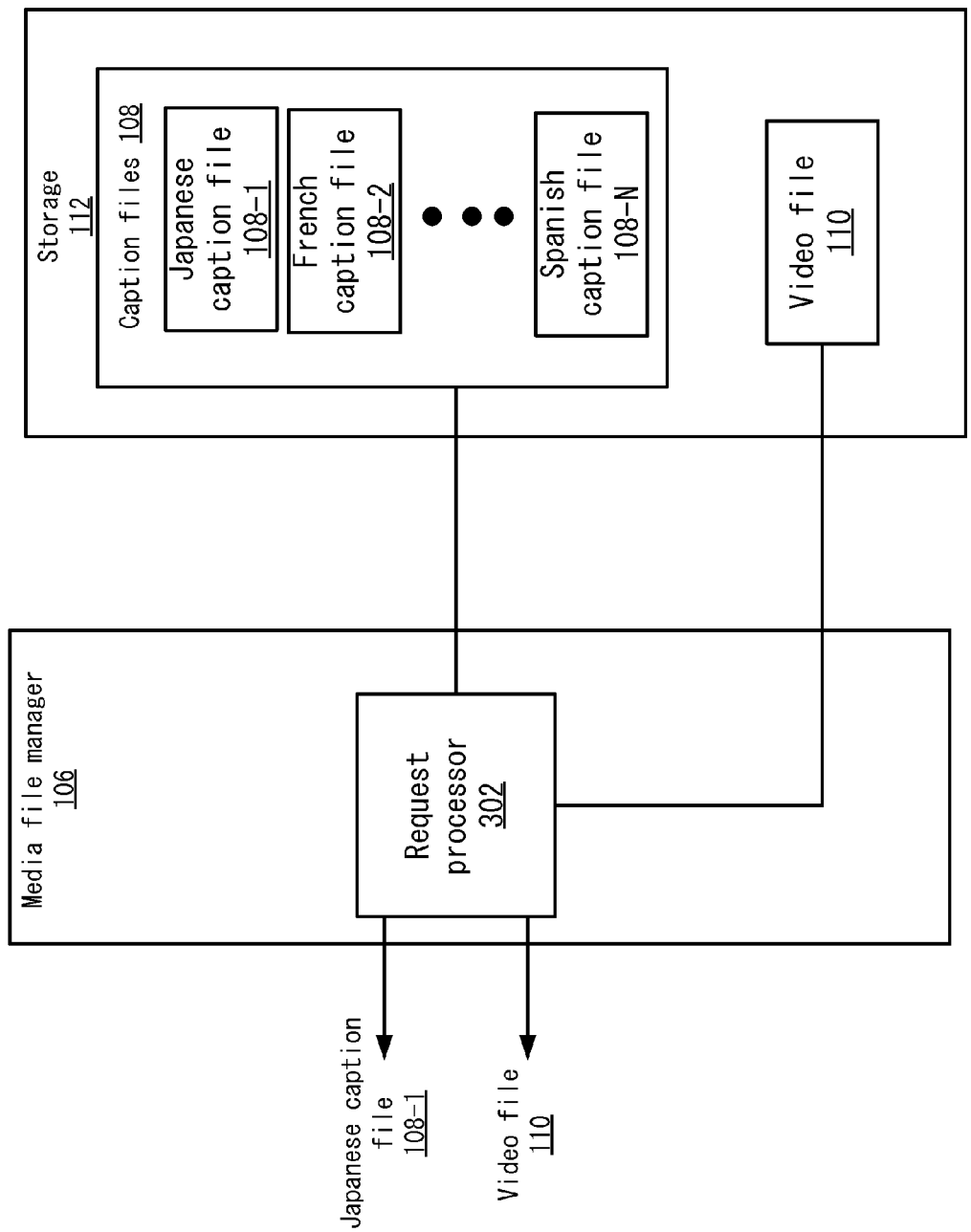
FIG. 3 depicts a more detailed example of media file manager according to one embodiment.

FIG. 3 depicts a more detailed example of media file manager 106 according to one embodiment. Media file manager 106 includes a request processor 302 that receives a request for a media program and can determine which video file 110 and which caption file 108 in storage 112 to stream to user device 104. For example, caption files 108 may include different files that correspond to video file 110. In one example, caption files 108 include captions for different languages for subtitles. Because caption file 108 is delivered out-of-band, only the requested caption file 108, such as the requested language for the subtitles, may be streamed to user device 104. Thus, captions for all languages do not need to be streamed as would be the case if captions for all languages were delivered in-band with video file 110.

Request processor 302 determines which caption file 108 is requested. For example, the request may include a parameter that indicates which language for subtitles is requested. Assuming Japanese is requested, request processor 302 retrieves video file 110 and caption file 108-1 for the Japanese language. Request processor 302 then streams video file 110 and caption file 108-1 to user device 104 in separate channels. Also, caption files 108-2-108-n do not need to be streamed to user device 104.

Figure 4:
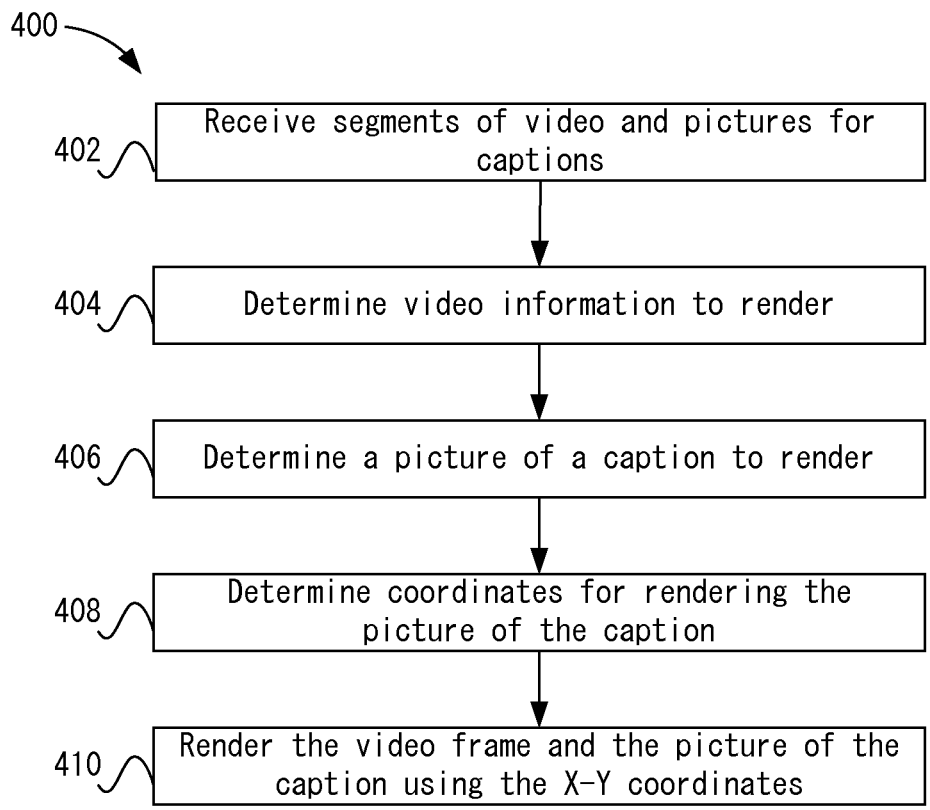
FIG. 4 depicts a simplified flowchart of a method for processing video files and caption files at a user device according to one embodiment.

FIG. 4 depicts a simplified flowchart 400 of a method for processing video files 110 and caption files 108 at user device 104 according to one embodiment. At 402, user device 104 receives segments of video and pictures for captions. For example, user device 104 may request segments of video and pictures of captions from server 102. In one example, each segment of video in video file 110 is requested along with each picture in caption file 108. The segments of video and the pictures may be requested based on a video playlist and a picture playlist. In another example, a segment of video is requested and a corresponding picture is also sent. User device 104 may request a range of video segments and pictures of captions, and buffer the received video segments and pictures of captions.

At 404, renderer 114 determines video information to render. For example, a frame of video is determined. At 406, renderer 114 determines a picture of a caption to render. For example, a picture of a caption may be associated with a time to display the picture along with a duration. For example, the caption may be displayed over a certain number of video frames or for a time period (e.g., 2 seconds). At 408, renderer 114 determines coordinates for rendering the picture of the caption. For example, X-Y coordinates may be provided for a location to render the picture. The picture may be placed at the bottom of the video, the side, the top, etc. In other examples, a full screen picture may be displayed without determining a location to render the picture. At 410, renderer 114 renders the video frame and the picture of the caption using the X-Y coordinates. The picture of the caption may be displayed for multiple video frames. The process then continues as renderer 114 renders video frames and pictures of captions.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   storing a caption file including a set of visual representations of captions for a media program and a video file including video information for the media program, wherein a renderer rendered text for the captions from a text file including text information to generate the set of visual representations such that the set of visual representations include the respective text for the captions;
   receiving, by a server, a request for the media program, the request associated with a user device;
   determining, by the server, the caption file and the video file for the media program based on the request; and
   sending, by the server, the set of visual representations of the captions from the caption file out of band with video information from the video file over a network to the user device, wherein the text for the captions has been rendered in the set of visual representations before sending of the set of visual representations to the user device and the user device is configured to directly overlay a visual representation of a caption from the set of visual representations over a visual representation of a portion of the video information without rendering of the visual representation of the caption at the user device.

2. The method of claim 1, wherein the renderer:
   receives time codes indicating when to render the text, generates the caption file by rendering the text information for the captions into the set of visual representations before sending of the set of visual representations to the user device, and outputs a playlist that describes when to overlay the set of visual representations over visual representations of the video information based on the received time codes.

3. The method of claim 1, further comprising sending, by the server, the set of visual representations of the captions from the caption file out of band with video information from the video file to a different user device, wherein the different user device is configured to overlay the visual representation of the caption over the visual representation of the portion of the video information, the caption displayed on the different user device being in a same format as the caption being displayed on the user device.

4. The method of claim 1, wherein the video file and the caption file are separate files.

5. The method of claim 1, wherein the video information is not multiplexed with the visual representations of the captions.

6. The method of claim 1, wherein sending comprises sending the set of visual representations of the captions in a separate channel from the video information.

7. The method of claim 1, further comprising storing a plurality of caption files for a plurality of languages for the media program, wherein only a portion of the caption files for a portion of the languages are sent to the user device with the video file.

8. The method of claim 1, wherein the set of visual representations are pictures.

9. The method of claim 1, wherein the visual representation of the caption is a different size from the visual representation of the portion of video information and the visual representation of the caption is rendered at a specified position over the visual representation of the portion of the video information by the user device.

10. A non-transitory computer-readable storage medium containing instructions, that when executed, control a computer system to be configured for:

storing a caption file including a set of visual representations of captions for a media program and a video file including video information for the media program, wherein a renderer rendered text for the captions from a text file including text information to generate the set of visual representations such that the set of visual representations include the respective text for the captions;

receiving a request for the media program, the request associated with a user device;

determining the caption file and the video file for the media program based on the request; and sending the set of visual representations of the captions from the caption file out of band with video information from the video file over a network to the user device, wherein the text for the captions has been rendered in the set of visual representations before sending of the set of visual representations to the user device and the user device is configured to directly overlay a visual representation of a caption from the set of visual representations over a visual representation of a portion of the video information without rendering of the visual representation of the caption at the user device.

11. The non-transitory computer-readable storage medium of claim 10, wherein the renderer:

receives time codes indicating when to render the text, generates the caption file by rendering the text information for the captions into the set of visual representations before sending of the set of visual representations to the user device, and outputs a playlist that describes when to overlay the set of visual representations over visual representations of the video information based on the received time codes.

12. The non-transitory computer-readable storage medium of claim 10, further configured for sending the set of visual representations of the captions from the caption file out of band with video information from the video file to a different user device, wherein the different user device is configured to overlay the visual representation of the caption over the visual representation of the portion of the video information, the caption displayed on the different user device being in a same format as the caption being displayed on the user device.

13. The non-transitory computer-readable storage medium of claim 10, wherein the video file and the caption file are separate files.

14. The non-transitory computer-readable storage medium of claim 10, wherein the video information is not multiplexed with the visual representations of the captions.

15. The non-transitory computer-readable storage medium of claim 10, wherein sending comprises sending the set of visual representations of the captions in a separate channel from the video information.

16. The non-transitory computer-readable storage medium of claim 10, further operable for storing a plurality of caption files for a plurality of languages for the media program, wherein only a portion of the caption files for a portion of the languages are sent to the user device with the video file.

17. The non-transitory computer-readable storage medium of claim 10, wherein the set of visual representations are pictures.

18. The non-transitory computer-readable storage medium of claim 10, wherein the visual representation of the caption is a different size from the visual representation of the portion of video information and the visual representation of the caption is rendered at a specified position over the visual representation of the portion of the video information by the user device.

19. A method comprising:

sending, from a user device, a request for a media program to a server, the media program associated with a caption file including a set of visual representations of captions and a video file;

receiving, at the user device, the set of visual representations of the captions from the caption file out of band with video information from the video file over a network from the server, wherein a renderer rendered text for the captions from a text file including text information to generate the set of visual representations such that the set of visual representations include the respective text for the captions before the set of visual representations are received;

determining, at the user device, a visual representation of a caption to render from the set of visual representations; and directly overlaying, at the user device, the visual representation of the caption over a visual representation of a portion of the video information without rendering of the visual representation at the user device, wherein captions in the visual representation that are rendered by different user devices are in a same format.

20. The method of claim 19, wherein the visual representation of the caption is a different size from the visual representation of the portion of video information, the method further comprising determining a location to render the visual representation, wherein the visual representation of the caption is overlaid at the location over the visual representation of the portion of the video information.

21. The method of claim 19, wherein the different user devices are of different types.

* * * * *